June 28, 1932.  H. CHARRIER  1,865,303

PRODUCTION OF NITRATE OF LIME

Filed June 18, 1929

H. Charrier
INVENTOR

By: Marks & Clerk
Attys.

Patented June 28, 1932

1,865,303

UNITED STATES PATENT OFFICE

HENRI CHARRIER, OF LILLE, FRANCE, ASSIGNOR TO SOCIETE ANONYME: APPAREILS ET EVAPORATEURS KESTNER, OF LILLE, FRANCE

PRODUCTION OF NITRATE OF LIME

Application filed June 18, 1929, Serial No. 371,874, and in France April 3, 1929.

The object of the invention consists in improvements in the processes relating to the production of nitrate of lime, and particularly in utilizing, for the reaction, no longer pure nitric acid, but a solution of nitrate of lime which is acidulated and cooled or sediments of carbonate of lime in suspension in a cooled solution of nitrate of lime.

It has been found that, in the production of nitrate of lime by the action of nitric acid on carbonate of lime, the most substantial losses of nitrogen occurred chiefly in the reaction tower.

The reaction is marked exothermic, thus:

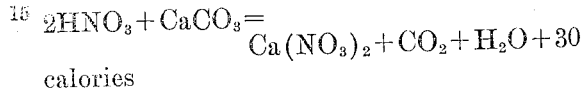

$$2HNO_3 + CaCO_3 = Ca(NO_3)_2 + CO_2 + H_2O + 30 \text{ calories}$$

and there is therefore a large rise of temperature resulting in dissociation of the nitric acid.

In small reaction towers, this rise of temperature is compensated for by the losses due to radiation, but when the towers become large, or if, instead of ordinary acid at 36° B. being 45% of $HNO_3$, one uses concentrated acid of 55–60% or more, as one now obtains it synthetically, the rise of temperature is very marked and the loss of nitrogen is increased.

According to the present invention this drawback is obviated by causing the nitric acid to react on carbonate of lime in the presence of a solution of nitrate of lime; thus the heat is dissipated in a larger mass and a smaller rise of temperature takes place. Preferably the solution is circulated and is cooled if it would otherwise be hot.

The solution may be mixed prior to the reaction either with the nitric acid or with the carbonate of lime, sufficient solution being employed in either case to attain the desired result.

Where a reaction tower is employed the carbonate of lime therein may be sprinkled with an acidulated solution of nitrate of lime instead of with nitric acid. This can be effected in various ways, and Fig. 1 illustrates diagrammatically and by way of example apparatus permitting this method to be put into practice.

Figure 1:
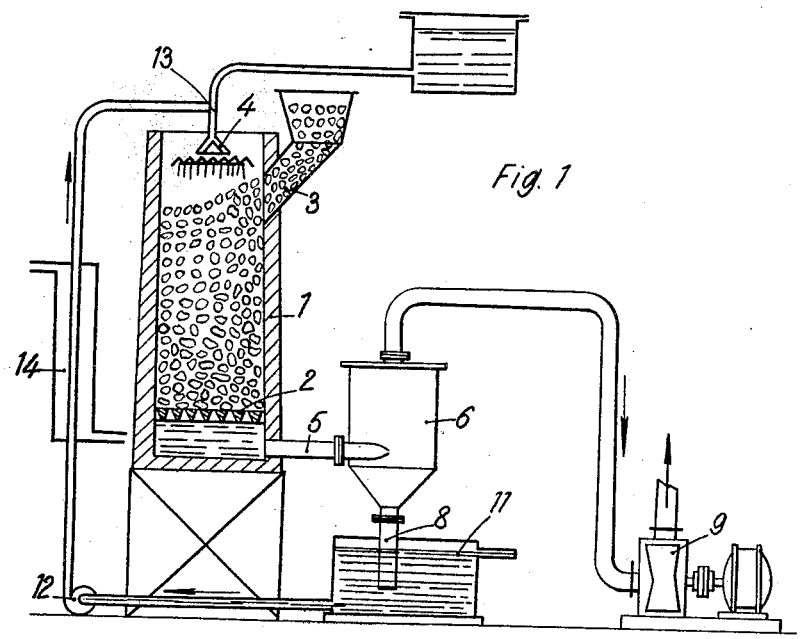

Referring more particularly to Fig. 1, a tower 1, at the lower end of which is provided a grating 2, is employed receiving carbonate of lime by a hopper 3, either alone or mixed with refractory blocks. The nitric acid flows for example from a charged higher reservoir through a distributor 4 and the solution of nitrate of lime passes from the lower part of the tower by a conduit 5 into a separator 6, in which the carbonic acid is separated from the solution of nitrate of lime which flows by a tube with hydraulic joint 8. The separator 6 is associated with a suction fan 9, which draws off the carbonic acid whilst the solution of nitrate of lime collects in a tank 11. There is employed, in the apparatus modified according to the present invention, for the reaction, no longer pure nitric acid but this acid mixed with the solution of nitrate of lime proceeding from the tank 11. For this purpose one provides a pump 12 sucking from the tank 11 and pumping side of the pump connecting at 13 with the pipes of the distributor.

At some point of the circuit is interposed a cooling device 14, which lowers the temperature of the nitrate of lime.

To produce nitrate of lime from nitric acid and carbonate of lime, instead of using solely bits of limestone, sediments of carbonate of lime proceeding from the caustification, from the production of sulphate of ammonia by the gypsum process, or other carbonate residue, may be employed. In this case reaction towers are no longer convenient for the production. This is why one has conceived making the nitric acid react not on the sediments of carbonate of lime but upon the sediments in suspension in a solution of nitrate of lime.

This process can be effected in different manners.

Figure 2:
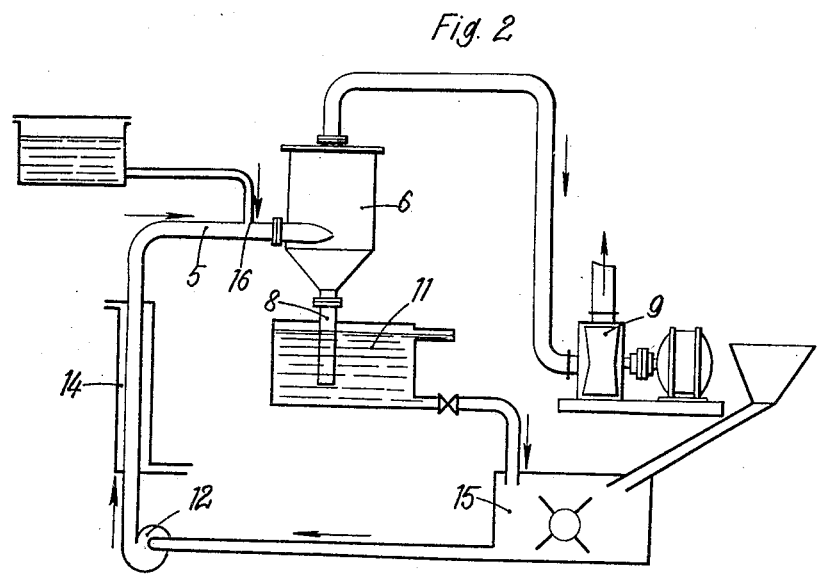

There is shown diagrammatically and by way of example, in Figure 2, an apparatus permitting the putting into practice of this alternative process.

Referring more particularly to Fig. 2, the sediments of carbonate of lime fed into a tank 15 are there mixed with water at the commencement of the operation, then after the start, with the solution of nitrate of lime coming from the tank 11.

These sediments of carbonate of lime in suspension in the solution of nitrate of lime are then taken up again by a centrifugal pump 12, which drives them into the separator 6. On the pump piping and just before this separator is connected at 16 the feed conduit for nitric acid. The reaction takes place with production of much froth which is broken up in the separator 6, of the cyclone type.

To avoid the loss of nitrogen due to the rise of temperature, the sediments of carbonate of lime in suspension in the solution of nitrate are cooled in circuit by a cooling device 14.

I claim:

1. An improvement in the process for the production of concentrated nitrate of lime by the action of concentrated nitric acid on carbonate of lime consisting in adding to one of these reagents, before their contact, a solution of nitrate of lime the concentration of which is substantially equal to that of the final product desired to be obtained.

2. A process as claimed in claim 1, in which the resulting solution of calcium nitrate is cooled and returned to one of the starting reagents.

In testimony whereof he has signed this specification.

HENRI CHARRIER.